(12) United States Patent
Gammel et al.

(10) Patent No.: US 8,983,068 B2
(45) Date of Patent: Mar. 17, 2015

(54) MASKED NONLINEAR FEEDBACK SHIFT REGISTER

(71) Applicant: Infineon Technologies AG, Neubiberg (DE)

(72) Inventors: Berndt Gammel, Markt-Schwaben (DE); Stefan Mangard, Munich (DE)

(73) Assignee: Infineon Technologies AG, Neubiberg (DE)

( * ) Notice: Subject to any disclaimer, the term of this patent is extended or adjusted under 35 U.S.C. 154(b) by 192 days.

(21) Appl. No.: 13/786,832

(22) Filed: Mar. 6, 2013

(65) Prior Publication Data

US 2014/0254792 A1 Sep. 11, 2014

(51) Int. Cl.
| | | |
|---|---|---|
| *H04L 9/00* | (2006.01) | |
| *H04L 9/28* | (2006.01) | |
| *H04L 9/06* | (2006.01) | |
| *G06F 7/58* | (2006.01) | |
| *G06F 3/06* | (2006.01) | |
| *G06F 21/71* | (2013.01) | |
| *G06F 21/72* | (2013.01) | |

(52) U.S. Cl.
CPC .. *H04L 9/28* (2013.01); *H04L 9/06* (2013.01); *G06F 7/584* (2013.01); *G06F 3/06* (2013.01); *H04L 9/0668* (2013.01); *G06F 7/58* (2013.01); *H04L 9/0662* (2013.01); *G06F 21/71* (2013.01); *G06F 21/72* (2013.01)
USPC .......... 380/46; 380/28; 380/44; 380/47; 713/189

(58) Field of Classification Search
CPC .......... H04L 9/00; H04L 9/06; H04L 9/0662; H04L 9/0668; H04L 9/28; G06F 21/71; G06F 21/72; G06F 7/584; G06F 3/06; G06F 7/58
USPC ........................... 380/28, 44, 46, 47; 713/189
See application file for complete search history.

(56) References Cited

U.S. PATENT DOCUMENTS

| | | | | |
|---|---|---|---|---|
| 5,727,064 | A | * | 3/1998 | Reeds, III ...................... 380/270 |
| RE36,752 | E | * | 6/2000 | Koopman et al. .............. 380/262 |
| 8,156,343 | B2 | * | 4/2012 | Robinson et al. .............. 713/189 |
| 8,291,221 | B2 | * | 10/2012 | Shamir ......................... 713/168 |
| 2004/0205095 | A1 | * | 10/2004 | Gressel et al. ................. 708/253 |
| 2009/0304179 | A1 | * | 12/2009 | Gressel et al. .................. 380/28 |
| 2011/0231464 | A1 | * | 9/2011 | Rivoir ........................... 708/232 |

OTHER PUBLICATIONS

Mansouri, et al. "An Architectural Countermeasure against Power Analysis Attacks for FSR-Based Stream Ciphers." COSADE 2012, LNCS 7275. Springer-Verlag, 2012. pp.54-68.

* cited by examiner

*Primary Examiner* — Jeffrey Pwu
*Assistant Examiner* — Jayesh Jhaveri
(74) *Attorney, Agent, or Firm* — Murphy, Bilak & Homiller, PLLC

(57) ABSTRACT

An NLFSR of length k, configured to output a sequence of masked values $x'_i = x_i + m_i$ according to a masked recurrence $x'_{n+k} = f(x'_n, \ldots, x'_{n+k-1})$, the NLFSR including a nonlinear feedback function configured to compute $f(x'_n, \ldots, x'_{n+k-1})$ so as to obtain a feedback value, a correction function configured to compute $(m_n, \ldots, n_{n+k-1}) + m_{n+k} + h(m_n, m_{n+k-1}, x_n, \ldots, x_{n+k-1})$ to obtain a correction value c, and a corrector configured to correct the feedback value $\hat{x}'_{n+k}$ using the correction value c to obtain a corrected feedback value which forms $x'_{n+k}$.

18 Claims, 9 Drawing Sheets

MASKED NONLINEAR FEEDBACK SHIFT REGISTER

TECHNICAL FIELD

Embodiments relate to a nonlinear feedback shift register configured to output a sequence of masked values. Further embodiments relate to cryptographic apparatuses comprising such nonlinear feedback shift registers.

BACKGROUND

Feedback shift registers are known in the art. In cryptographic applications, feedback shift registers are used in order to generate, in a pseudo-random manner, a sequence of values. Feedback shift registers (FSR) may generally be subdivided into nonlinear feedback shift registers (NLFSR) and linear feedback shift registers (LFSR). Especially nonlinear feedback shift registers are used as a basic security primitive in many types of stream ciphers. Furthermore, they are also used in deterministic random number generators (DRNG), and in on-chip security countermeasures of security controllers such as the means for generating masks for the protection against side-channel attacks (SCA) and probing attacks.

It is possible to mount side-channel and probing attacks against implementations of NLFSRs if these are not protected accordingly. A well-known mathematical countermeasure against SCA and probing are secret sharing schemes (SSS), which is also known as masking in the field of SCA. Applying an SSS to linear functions, e.g. linear circuit nets and linear feedback shift registers, is a trivial task. Applying SSS to nonlinear functions is a non-trivial field of research.

SUMMARY

Embodiments provide an NLFSR of length k, configured to output a sequence of masked values $x'_i = x_i + m_i$ according to a masked recurrence $x'_{n+k} = f(x'_n, \ldots, x'_{n+k-1})$, the NLFSR comprising a nonlinear feedback function configured to compute $f(x'_n, \ldots, x'_{n+k-1})$ so as to obtain a feedback value, a correction function configured to compute $f(m_n, \ldots, m_{n+k-1}) + m_{n+k} + h(m_n, \ldots, m_{n+k-1}, x_n, \ldots, x_{n+k-1})$ to obtain a correction value c, and a corrector configured to correct the feedback value $\hat{x}'_{n+k}$ using the correction value c to obtain a corrected feedback value which forms $x'_{n+k}$.

Further embodiments provide a corresponding method and a corresponding method for pseudo-randomly generating a sequence of masked values, and a corresponding cryptographic apparatus such as a chip card, a cryptographic chip or a cellular phone.

BRIEF DESCRIPTION OF THE DRAWINGS

Embodiments of the present invention are described herein below making reference to the appended drawings. Equal or equivalent elements or elements with equal or equivalent functionality are denoted in the following description by equal or equivalent reference numerals.

DETAILED DESCRIPTION

In the following description, a plurality of details are set forth to provide a more thorough explanation of embodiments of the present invention. However, it would be apparent to those skilled in the art that embodiments of the present invention may be practiced without these specific details. In other instances, well-known structures and devices are shown in the block diagram form rather than in detail in order to avoid obscuring embodiments of the present invention. In addition, features of the different embodiments described hereinafter may be combined with each other, unless specifically noted otherwise.

Figure 1:
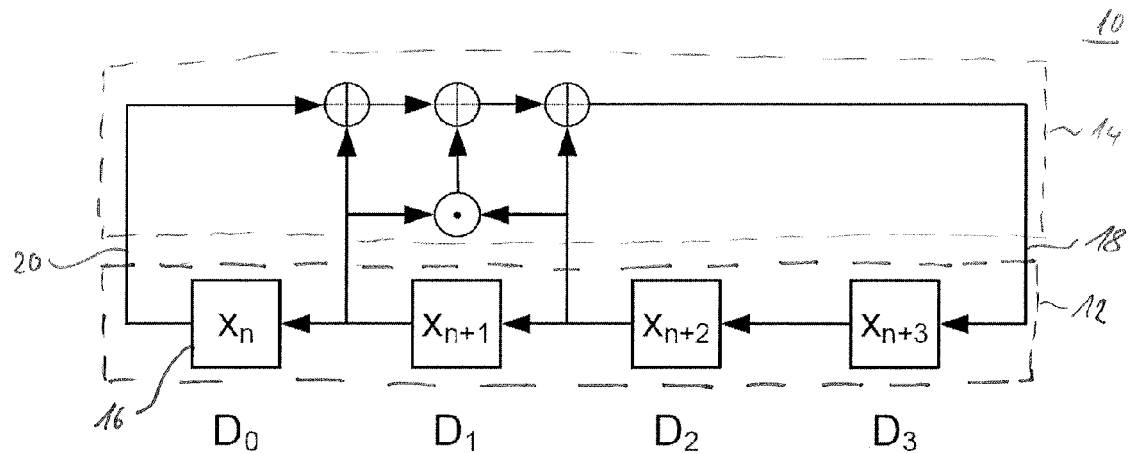
FIG. 1 shows a block diagram of a plain (in the following called "unmasked") NLFSR.

In order to render the understanding of the principles underlying the embodiments further outlined below more clear, a simple example of a nonlinear feedback shift register is discussed with respect to FIG. 1. The NLFSR of FIG. 1 is indicated using reference sign 10 and comprises a shift register 12 and a nonlinear feedback function 14. The shift register 12 is exemplarily shown to be implemented using a sequence of m registers 16 serially connected between an input 18 and an output 20 of shift register 12. The nonlinear feedback function 14 is connected to outputs of registers 16 such as, for example, the output of register 16 of shift register 12, which is the last in line, i.e. output 20, and outputs a feedback value to input 18, i.e. the input of register 16 of shift register 12 being the first in sequential order.

The nonlinear feedback shift register 10 of FIG. 1 is exemplarily of length n=4 and defined by the nonlinear feedback function. However, different n's are also feasible, just as other feedback functions do.

As usual, the operations '+' and denote the addition and the multiplication in GF(2), respectively. Hence they correspond to the Boolean operations XOR and AND. In the schematics in the figures they are denoted by $\oplus$ and $\odot$, respectively. NLFSR 10, is primitive. That means, it fixes the all-zero state and each nonzero initial state will recur for the first time after $2^n - 1$ clock cycles. In other words the state of the shift register repeats itself periodically with the maximum possible smallest period per=$2^n - 1$, (per=15 for N1).

It is noted, that the construction put forward in the following is not restricted to primitive (maximum period) feedback shift registers. Nor is it restricted to operations in the field GF(2). All results can be transferred to the field $GF(q^n)$ of characteristic q=2, 3, . . . and n=1,2, . . . . In this case the operations '+' and '.' denote the respective field addition and multiplication operations.

If the state of NLFSR 10 is initialized with $(D_0,D_1,D_2,D_3)=(1, 0, 0, 0)$ the NLFSR 10 will output the sequence:

$$(1, 0, 0, 0, 1, 0, 1, 1, 0, 1, 0, 0, 1, 1, 1)^\infty \qquad (1)$$

at the coordinate $D_o$. NLFSR 10 is characterized by the 4-term recurrence:

$$x_{n+4}=f(x_n, x_{n+1}, x_{n+2}, x_{n+3})=x_n+x_{n+1}+x_{n+2}+x_{n-1}x_{n+2}. \qquad (2)$$

Let $m_i \in \{0, 1\}$ be independent and uniformly distributed binary mask values. We will later on discuss how these can be generated efficiently. A simple masking scheme with two shares is achieved by lifting each value $x_i$ to the pair $(x_i+m_i, m_i)$. We call $x_i+m_i$ the masked value and write:

$$x'_i=x_i+m_i, \qquad (3)$$

Inserting $x'_i=xi+mi$ into the recurrence (2) yields:

$$\begin{aligned}
x'_{n+4} &= x'_n + x'_{n+1} + x'_{n+2} + x'_{n+1}x'_{n+2} + \\
&\quad [m_n + m_{n+1} + m_{n+2} + m_{n+1}m_{n+2} + m_{n+4} + \\
&\quad m_{n+1}x'_{n+2} + m_{n+2}x'_{n+1}] \\
&= f(x'_n, \ldots, x'_{n+3}) + [f(m'_n, \ldots, m'_{n+3}) + m_{n+4} + \\
&\quad m_{n+1}x'_{n+2} + m_{n+2}x'_{n+1}] \\
&= f(x'_n, \ldots, x'_{n+3}) + c(m_n, \ldots, m_{n+4}; x'_n, \ldots, x'_{n+3})
\end{aligned}$$

Clearly, it follows from the additive nature of the masking operation that the terms of the original recurrence f(.) will always reappear for the masked values and the masks. Additionally, there are mixed terms of masks and masked values, as well as one term with the fresh mask ($m_{n+4}$). We collect all terms outside the original recurrence in the so-called mask correction function.

$$c(m_n, \ldots, m_{n+4}x'_n, \ldots, x'_{n+3})=m_n+m_{n+1}+m_{n+2}+m_{n+1}m_{n+2}+m_{n+4}+m_{n+1}x'_{n+2}m_{n+2}x'_{n+1}. \qquad (4)$$

Figure 2:
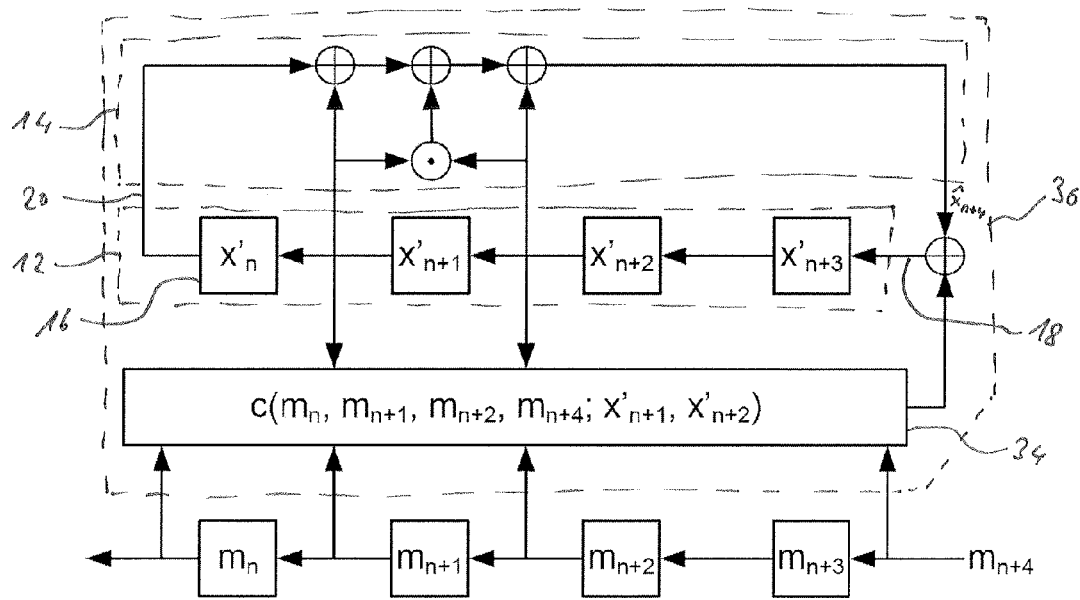
FIG. 2 shows a bock diagram of a masked NLFSR in accordance with an embodiment exemplarily resulting in a masked version of the value sequence of the NLFSR of FIG. 1.

From these considerations we find that a masked realization of NLFSR 10 can be cast into the structure shown in FIG. 2 which, accordingly, forms an embodiment for an NLFSR according to an embodiment.

In particular, the NLFSR of FIG. 2 is generally indicated using reference sign 30. In addition to the components of FIG. 1, the NLFSR 30 of FIG. 2 comprises a corrector 32 connected between the output of the nonlinear feedback function 14 and the input 18 of shift register 12 so as to correct the feedback value $\hat{x}'_{n+k}$ using a correction value c by, in the present embodiment, computing $\hat{x}'_{n+k}$+c to obtain the masked feedback value $x'_{n+k}$ input to input 18. For providing the correction value c, the NLFSR 30 of FIG. 2 comprises a mask correction function 34 which receives a subset of the mask values corresponding to the masked values $x'_n \ldots x'_{n+3}$ currently stored in registers 16, i.e. $m_n \ldots m_{n+3}$, and is connected to outputs of a set of registers 16 in order to receive the masked values $x'_i$ registered therein, so as to compute the correction value c according to formula 4.

The inventors found out that the construction of masked correction function c is always possible. For any k-term recurrence:

$$x_{n+k}=f(x_n, x_{n+1}, \ldots, x_{n+k-1})$$

(constituting an NLFSR) the decomposition for a masked recurrence can be can constructed $$x'_{n+k}=f(x'_n, \ldots, x'_{n+k-1})+c(m_n, \ldots, m_{n+k}; x'_n, \ldots, x'_{n+k-1}).$$

where the mask correction function has the shape $$c(m_n, \ldots, m_{n+k}; x'_n, \ldots, x'_{n+k-1}) = $$
$$f(m_n, \ldots, m_{n+k-1}) + m_{n+k} + h(m_n, \ldots, m_{n+k-1}; x'_n, \ldots, x'_{n+k-1})$$

Function h(.) contains only the mixed terms $x'_i$ and $m_i$. That is, function h(.) is, for example, a sum of products $x'_i m_j$ with different pairs of i, j.

Figure 3:
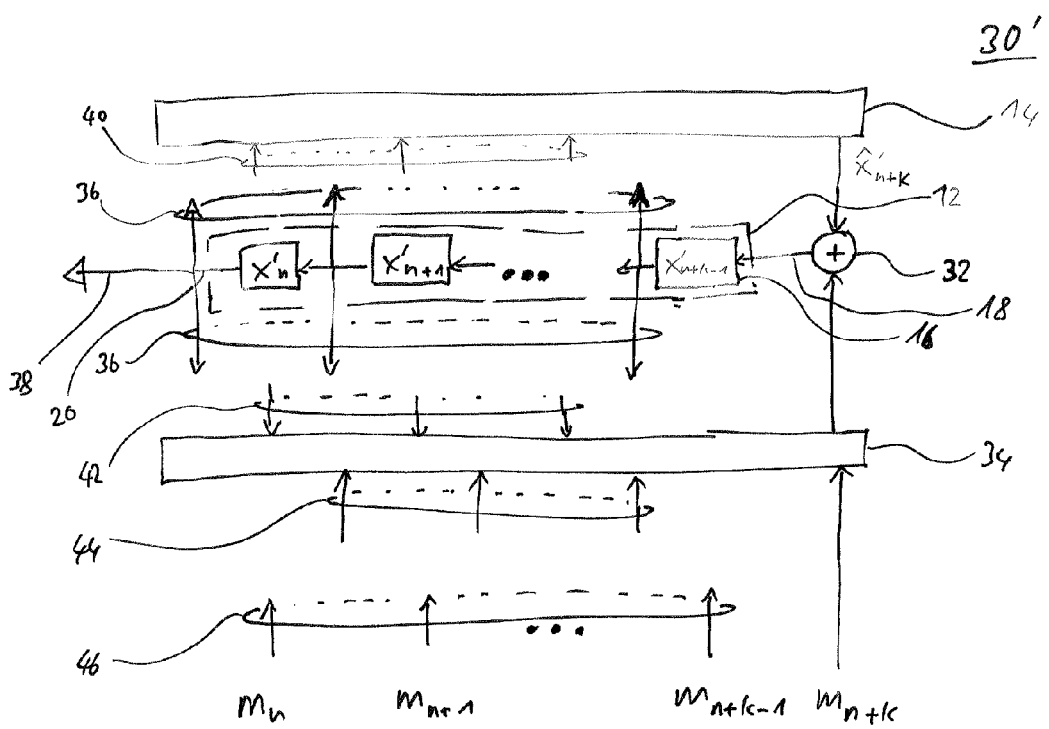
FIG. 3 shows a bock diagram of a NLFSR for putting out a masked value sequence according to a more generic embodiment.

Accordingly, FIG. 3 shows an embodiment for an NLFSR in accordance with an embodiment more generically. The NLFSR of FIG. 3 is generally indicated using reference sign 30' and shown to be of length k which may be any integer wherein, however, k>10 would be preferred in security relevant applications. As described above, the NLFSR 30' is configured to output a sequence of masked values $x'_i=x_i+m_i$ with $x_i$ being unmasked values and $m_i$ being masked values. To be more precise, each unmasked value $x_i$ has its own mask value $m_i$ associated therewith which are, preferably, statistically independent from each other, i.e. $m_i$ is statistically independent of $m_j$ with any $i \neq j$. The NLFSR 30' outputs the sequence of masked values according to a masked recurrence $x'_{n+k}=f(x'_n, \ldots, x'_{n+k-1})$. It is noted that any of the outputs 36 of registers 16 of shift register 32 of NLFSR 30' may serve as an output 38 at which NLFSR 30' outputs the sequence of masked values $x_i$ wherein, however, FIG. 3 illustrates the usage of the output 20 of shift register 12, i.e. the output of the last register 16 in the sequential order of registers 16 of shift register 12. The shift register 12 cyclically shifts the masked value $x'_n$ in the last register 16 out, $x'_{n+1}$ to a next register in line where $x'_{n+l-1}$ has previously been stored, for all $0<l<n$, and adopt the (corrected) feedback value as $x_{n+l-1}$.

The NLFSR 30' of FIG. 3 comprises a nonlinear feedback function 14 configured to compute $\hat{x}'_{n+k}=f(x'_n, \ldots, x'_{n+k-1})$. As illustrated in FIG. 2, the nonlinear feedback function 40 may comprise a circuit of Boolean logic gates such as XOR and AND gates implementing additions and multiplications within nonlinear function f(.). The inputs of the feedback circuit of nonlinear feedback function 14 would be connected to outputs 40 of a subset of the outputs 36 of registers 16, while an output of the feedback circuit is connected to the input of shift register 18, directly or via corrector 32, as illustrated here. The nonlinear feedback shift register 30' further comprises a mask correction function 34 configured to compute $f(m_n, \ldots, m_{n+k-1})+m_{n+k}+h(m_n, \ldots, m_{n+k-1}, x_n, \ldots, x_{n+k-1})$ to obtain a correction value c and a corrector 32 comprised by the NLFSR 30' corrects the feedback value $\hat{x}'_{n+k}$ with c to obtain the feedback value $x'_{n+k}$ which is fed back into shift register 12 of NLFSR 30'.

As became clear from the above discussion, the mask correction function may comprise a combinatorial circuit the inputs of which are connected to a subset 42 of the outputs 36 of registers 16 of shift register 12 and have at least a subset 44 of those mask vales 46 applied thereto, which are associated with the masked values $x'_n \ldots x'_{k-1}$ currently registered in shift register 12 as well as the mask value $m_{n+k}$ associated with the feedback value representing $x'_{n+k}$. Subset 44 comprises, at least, those mask values which are associated with a masked value currently stored in those registers 16 the outputs of which are contained in set 40 and form, in other words, inputs of nonlinear feedback function 14.

It should be noted that possible implementations of the NLFSR 30' of FIG. 3 are not restricted to hard-wired ones. Rather, an NLFSR 30' of FIG. 3 may also be implemented using software or configurable hardware, i.e. firmware.

As also outlined above, function h(.) may contain only mixed terms of $x_i'$ and $m_j$. That is, h(.) may be written as $$h = \sum_{p=1}^{P} \prod_{q=1}^{Q(p)} \prod_{r=1}^{R(p)} x'_{s(q)} m_{t(r)}$$

$n \leq s(q) \leq n+k-1$ for all $1 \leq q \leq Q(p)$ and all $1 \leq p \leq P$ $n \leq t(r) \leq n+k-1$ for all $1 \leq r \leq R(p)$ and all $1 \leq p \leq P$ It may be that $Q(p)=R(p)=1$ for all $1 \leq p \leq P$, i.e. all summands are products of two factors one of which is a masked value and the other one of which is a mask value.

As will be outlined in more detail below, the mask correction function may be implemented in a DPA secure manner such that any intermediate results within the masked correction function is statistically uncorrelated with all of the unmasked values.

Accordingly, in the following, a DPA secure implementation of the mask correction function is presented.

Figure 4:
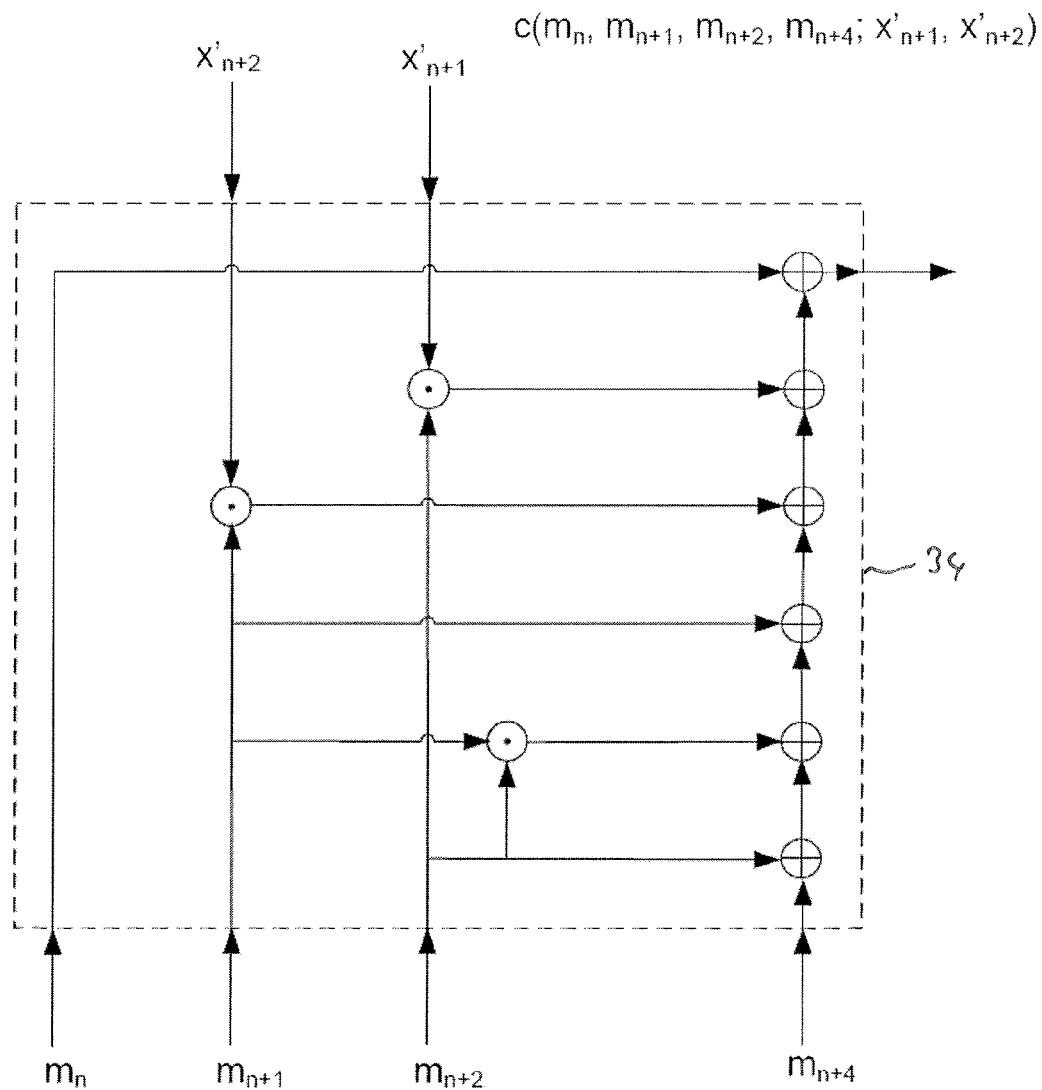
FIG. 4 shows a schematic of a possible mask correction circuit for the NLFSR of FIG. 2.

A naive implementation of the mask correction function (4) is shown in FIG. 4 below. This implementation is generally susceptible to DPA attacks. The reason is that it is not guaranteed that every intermediate result on any wire is statistically uncorrelated with the plain (unmasked) values. Nor is it guaranteed that this property holds also in the presence of glitches.

Figure 5:
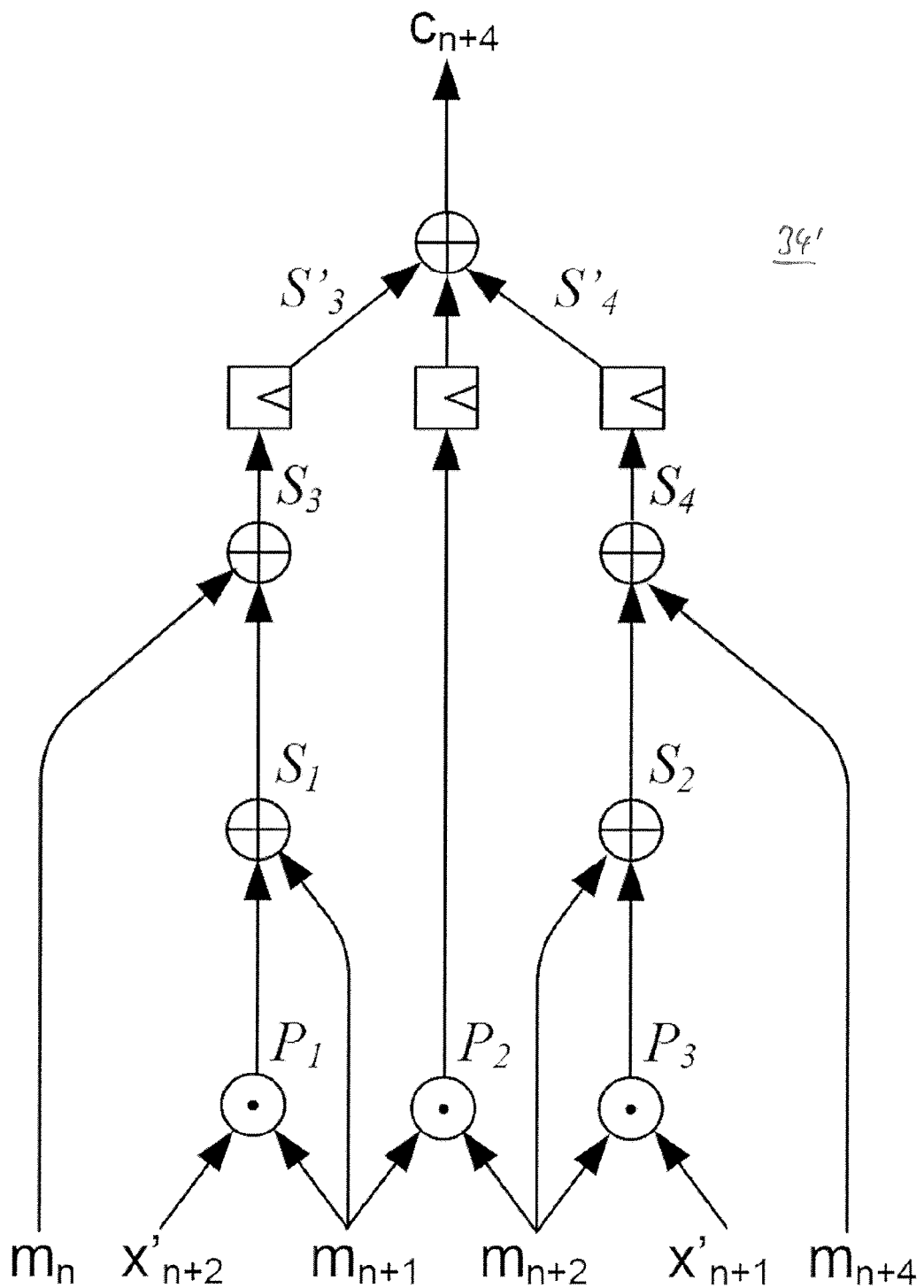
FIG. 5 shows a schematic of a possible glitch and DPA secure implementation of a mask correction circuit for the NLFSR of FIG. 2.

A DPA secure combinatorial net for the calculation of the mask correction is exemplarily shown in FIG. 5 (For the moment let us skip the sequential circuit elements). This summation tree is constructed such that only statistically independent intermediate results are combined. Consider for example the addition of $m_{n+1}$ to $P_1$. This is allowed because $m_{n+1}$ is statistically independent of $m_{n+2}$, which is the additive mask value of $x'_{n+2}$. Hence, the result $S_1$ is statistically independent of $x_{n+2}$. On the contrary a direct summation of $P_1$ and $m_{n+2}$ would be harmful in a DPA. The subsequent addition of the mask $m_n$ to $S_1$ yields $S_3$. Hence, the intermediate result $S_3$ is now statistically independent of $m_{n+1}$, $m_{n+2}$, and $m_{n+4}$. Hence, $S_3$ can be safely combined with $P_2$ and $S_4$ (which are correlated with $m_{n+1}$, $m_{n+2}$, and $m_{n+4}$.

To make the circuit DPA secure even in the presence of glitches we further add sequential circuit elements which serve as gates to suppress the glitches. The background for this measure is that dynamic hazards can lead to a situation that, e.g., the signal $m_n$ is not stable before $S_1$. Then the intermediate values of $S_3$ and $c_{n+4}$ could be correlated with the plain value $x_{n+2}$.

General Rule

In a combinatorial circuit any masked value $x'_i$ can be combined only with statistically independent values, i.e. masks $m_j (j \neq i)$ or masked values $x'_k (k \neq i)$.

A statistically independent mask value m can be used to mask a value $x_j$ before combining it with a correlated value $y=f(x'_j, m_j, \ldots)$. However, the masked value $x'_j + m$ must be registered before combining it with y.

An explanation of the aforementioned general rule is as follows: an already masked value $x'_j$ may be added to any statistically independent value wherein, as already noted above, adding corresponds to an exclusive XOR operation in the binary domain. Statistically independent means a) each mask $m_i$ with $i \neq j$. (If i was equal to j, then the mask would cancel each other out according to $x'_j + m_j = (x_j + m_j) + m_j = x_j + (m_j + m_j) = x_j + 0 = x_j$ and the value would be present in plain text again)

b) it would also be feasible to add another already masked value $x_i$, since same would be statistically independent of $x'_j$, i.e. $x'_j + x'_k$ for all $j \neq k$).

However, with regard to the statement that a correlated value may be added provided that same has been made independent in advance by use of a new mask m, the following is noted: For example, imagine we would have to add the value y to $x'_j$, wherein y is statistically correlated to $x'_k$ because of, for example, $y=f(x'_j, m_j, \ldots)$. In that case, we would have to add a new mask to $x'_j$, i.e. $(x'_j + m) + y$. In the present case, the parenthesis are important: Computing $(x'_j + y) + m$ would be mathematically equivalent, but the addition $(x_j + y)$ would already leak side-channel information, since $x'_j$ and y are, as denoted above, statistically dependent from each other. That is, in a CMOS circuit implementation, for example, the result $z=(x'_j + m)$ should be computed first and written into a register and merely then, within a next clock cycle, $z+y$ should be computed. A purely combinatorial circuit could leak side information since, generically, there is no accurate control of signal delays in the individual branches of this combinatorial tree.

The fact that the addition of a new mask which has not yet been involved in the combinatorial tree renders an intermediate result statistically independent of any other term had been illustrated with respect to FIG. 5. See, for example, the addition of mask $m_n$ in $S_3 = S_1 + m_n$. This addition renders $S_3$ statistically independent of all other terms. Likewise, $M_{n+4}$ in $S_4 = S_2 + m_{n+4}$ renders the term $S_4$ statistically independent so that $P_2$ may be added to $S_3$ and $S_4$, although $P_2$ is correlated with $S_1$ and $S_2$ since masks $m_{n+1}$ and $m_{n+2}$ influence both of the letters.

Naturally, the above discussion of DPA secure implementations are measures to suppress glitches or likewise transferable to the generic embodiment of FIG. 3.

Figure 6:
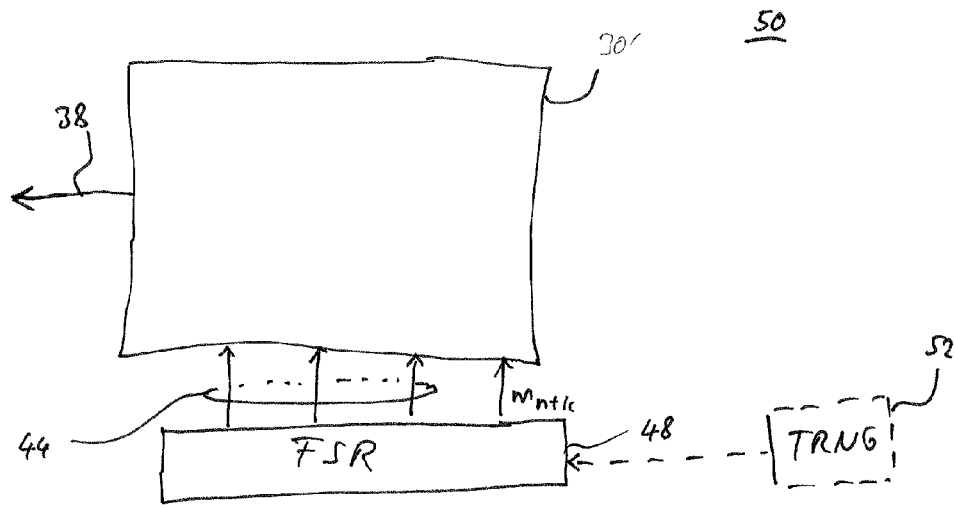
FIG. 6 shows a bock diagram of an apparatus for generating a masked value sequence according to an embodiment.

Next, with regard to FIG. 6, the NLFSR 30' of FIG. 3 is shown to be connected to an FSR 48 which provides the relevant mask values 44 along with mask value $m_{n+k}$ to NLFSR 30'. NLFSR 30' along with FSR 48 form an apparatus for pseudo-randomly generating a sequence of masked values, the apparatus generally indicated with reference signs 50. As indicated by dashed lines in FIG. 6, the feedback shift register 48 is preferably seeded by a true random number generator TRNG 52 and/or its internal state intermittently influenced by the TRNG 52. In operation, the feedback shift register 48 is clocked synchronously to NLFSR 30'. That is, internal registers or feedback shift registers 48 are controlled to perform shift operations synchronously to the shift register of NLFSR 30'.

Figure 7A:
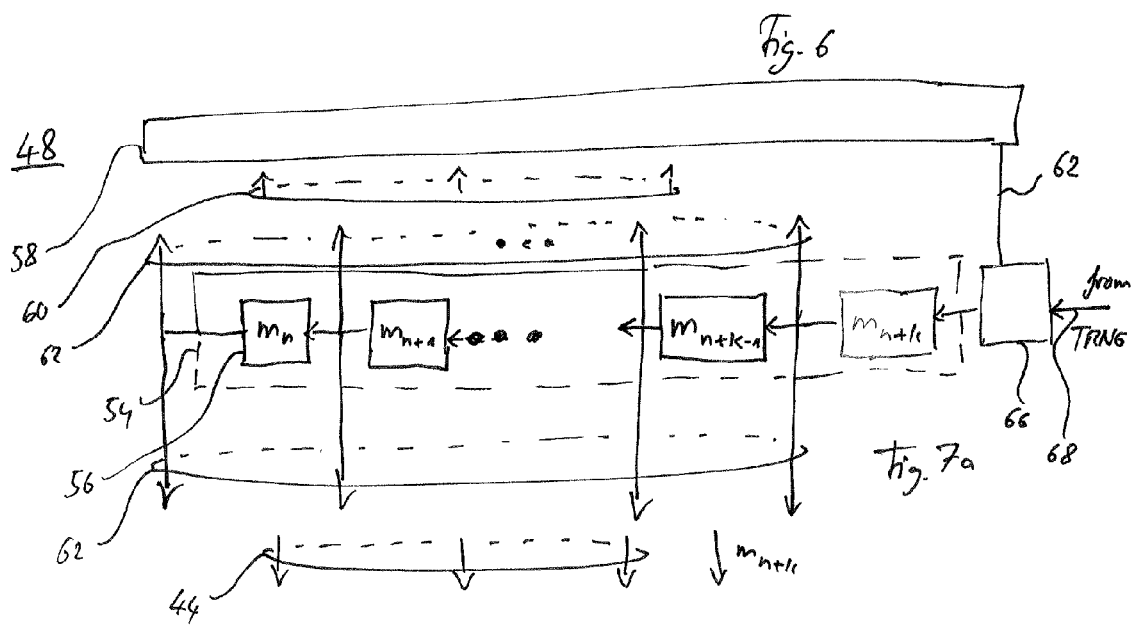
FIG. 7a,b show bock diagrams of possible implementation of a FSR for generating the mask values.

FIG. 7a shows a possible implementation for the feedback shift register 48. As can be seen, feedback shift register 48 may comprise a shift register 54 comprising a sequence of register stages 56. Here, k+1 registers 56 are shown to be sequentially connected to each other so as to form shift register 54, but the number could even be higher. A feedback function of FSR 48 might be linear in case the feedback shift register 48 being an NLFSR or nonlinear in case of SFR 48 being an NLFSR 58. Same is configured to subject a subset 60 of the outputs 62 of registers 46 to a feedback function, i.e. to combine them, in order to result into a feedback signal 62 fed back into the input of shift register 54, i.e. to the input of the first register 56 thereof. As is also shown in FIG. 7a, an influencer 66 is somewhere connected into the loop extending between the output of feedback function 58 and the input thereof such as, as shown in FIG. 7a illustratively, between the output of feedback function 58 and the input of shift register 54, so as to enable a modification of the feedback shift registers' 48 internal state as stored in registers 56 by true random number values 68 inbound from true random number generator 52.

As the number of outputs 62 of registers 56 is, in accordance with this embodiment, k+1 or higher, there is no problem in dividing the set of relevant mask values 44 along with mask value $m_{n+k}$ based on these outputs 62 so as to be input into NLFSR 30'.

Figure 7B:
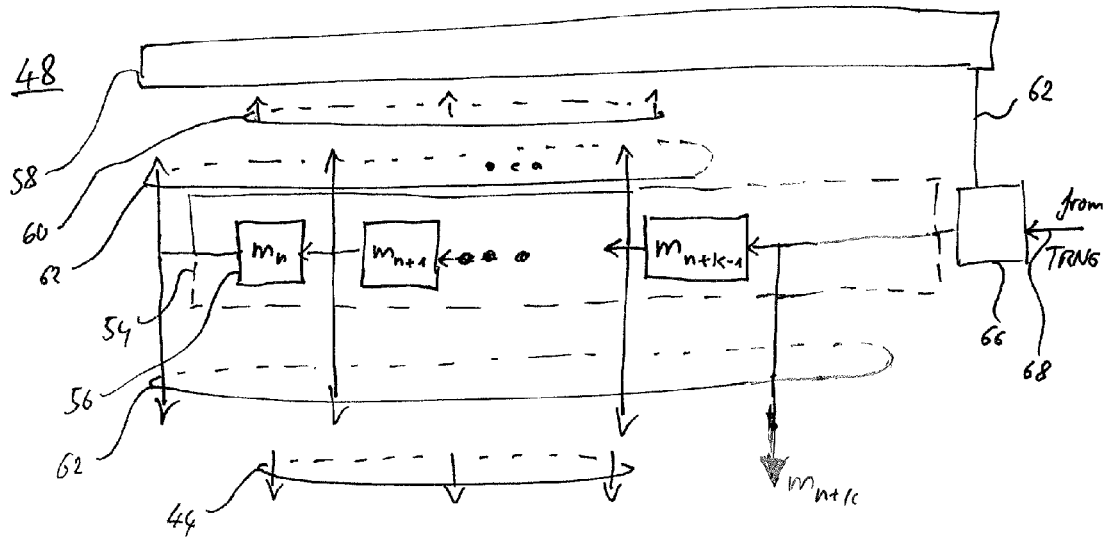

As shown in FIG. 7b, however, and as will be outlined in a more specific manner hereinafter, the number of registers 56 of FSR 48 may also be k, i.e. equal to the number of registers of the shift register of NLFSR 30'. This is made possible by including the feedback value 62 as output by feedback function 58 into the set of output values out of which the set of relevant mask values 44 along with mask values $m_{n+k}$ are obtained. In particular, in that case, the value fed back into shift register 54 then forms mask value $m_{n+k}$.

Figure 8:
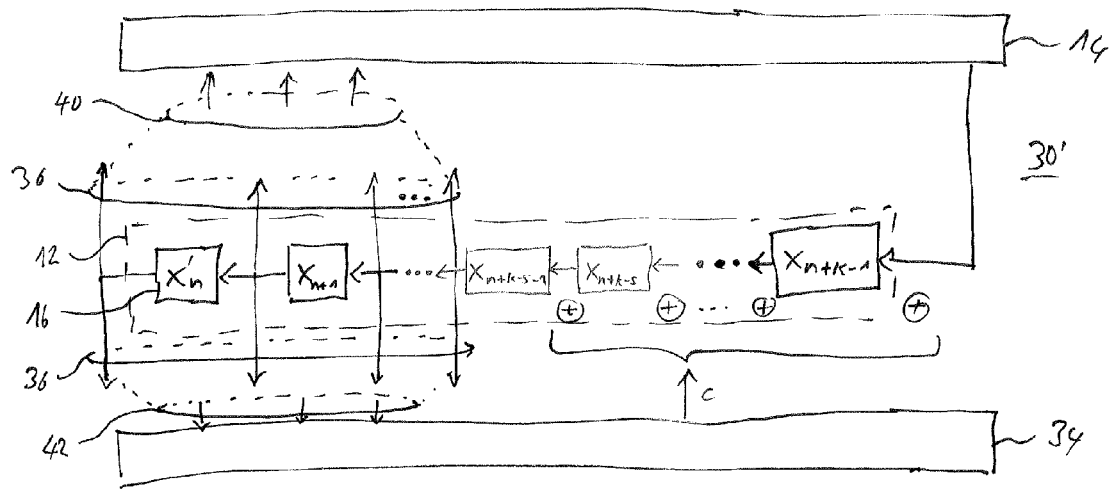
FIG. 8 shows a bock diagram of a NLFSR for putting out a masked value sequence according to an embodiment enabling efficient combination of glitch suppression and mask correction.

As also became clear from the above discussion, in order to suppress glitches and the corresponding problems with regard to security attacks, the NLFSR's mask correction function 34 may comprise a pipeline structure, i.e. same may comprise sequential circuit elements resulting in one or more pipeline stages, resulting, in turn, in delay at which the correction value is available at the output of the mask correction function relative to the nonlinear feedback function, respectively, namely a delay of a number of clock cycles of shift register 12 of NLFSR 30' being equal to the number of pipeline stages provided within the mask correction function. In a preferred embodiment, this delay is accounted for without penalties by corrector 32 correcting feedback value $\hat{x}'_{n+k}$ at the output of any of the outputs of the first I registers 16 of shift register 12 rather than the input of shift register 12 by designing the NLFSR's nonlinear feedback function 14 such that the relevant register outputs 40 do not comprise the outputs of these s first registers 16 when seen from the input 18 of shift register 12. FIG. 8 illustrates an appropriately designed NLFSR 30'. As illustrated therein, the first s registers 16 of shift register 12 neither form an input of nonlinear feedback function 14 nor mask correction function 34, i.e. set 40 and 32 of a subset of the remaining registers' outputs, and accordingly, the corrector 32 being implemented by an XOR gate may be positioned in front of the input of the first register 16 of shift register 12 between the input thereof and the output of nonlinear feedback function 14 as it was shown in FIG. 3, or at the output of any of the first s registers 16 between the output of any of these s first registers and the immediately following register 16 so as to subject the output value thereof to XOR-ing with correction value z. s may be 1 or even greater than 1 and may be used to accommodate the pipeline stage delay potentially contained in the implementation of the mask correction function 34 so as to suppress glitches as already outlined above.

In order to illustrate the possibilities outlined above with respect to FIGS. 6 to 8 in a more concrete manner, reference is made to the following figures and their description with regard to which an integration of a pseudo-random mask generator for generating the mask values is explained.

Integration of Pseudo-Random Mask Generator

In this section a highly optimized architecture for a masked NLFSR 30 as shown in FIG. 2, called N1 is described in the following. It is necessary to keep a shift sequence of mask values which are needed to calculate the mask corrections, see FIG. 2. Hence, it is tempting to re-engineer this shift sequence to a fully blown NLFSR, which generates a pseudo-random sequence of masks.

We define a second primitive NLFSR N2 of the same length as N1 by $$g(x_0, x_1, x_2, x_3) = x_0 + x_2 + x_1 + x_3 + x_2 + x_3. \tag{5}$$

Figure 9:
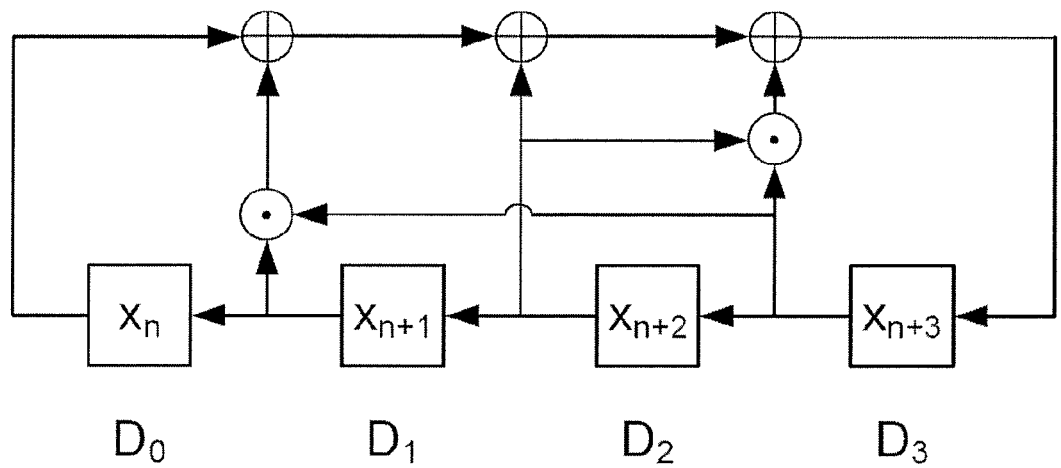
FIG. 9 shows a schematic of a possible generating NLFSR.

It produces the maximum length sequence $$(1, 0, 0, 0, 1, 0, 1, 1, 1, 1, 0, 0, 1. 1, 0)^\infty$$

at the coordinate $D_0$. The schematic of NLFSR N2 is shown in FIG. 9.

Figure 10:
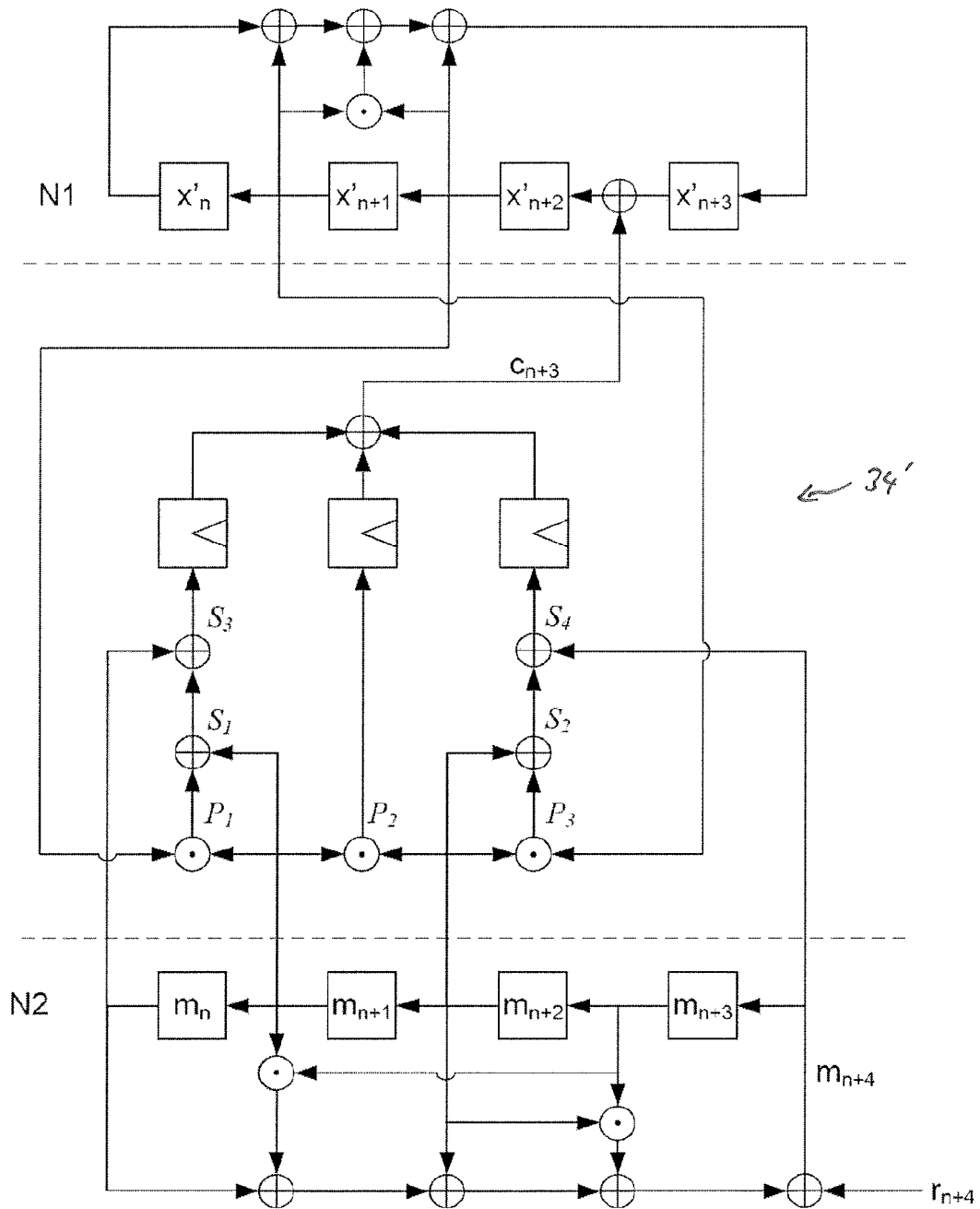
FIG. 10 shows a schematic of a possible masked value sequence generating apparatus.

The complete circuit for a DPA secure masked implementation of NLFSR N1 is shown in FIG. 10. A few comments are useful:

N2 may be seeded by a true random number generator on initialization and during operation (indicated by the truly random bit $r_{n+4}$) with a rate which can be less than the clock frequency.

Since the mask correction circuit contains one pipeline stage, the mask correction value must be added one stage later, cf. FIG. 2. This easily possible because the value of register $D_3$ does not enter the feedback function of N1.

Thus, in accordance with the above embodiments, NLFSRs can be implemented efficiently using a secret sharing scheme with two shares. The described masked implementation is secure against first order differential power analysis and first order probing attacks. Resistance against attacks exploiting the presence of glitches has been considered explicitly. The examples given in this letter can be extended easily to any NLLFSR (and LFSR) of practically realistic size.

Figure 11:
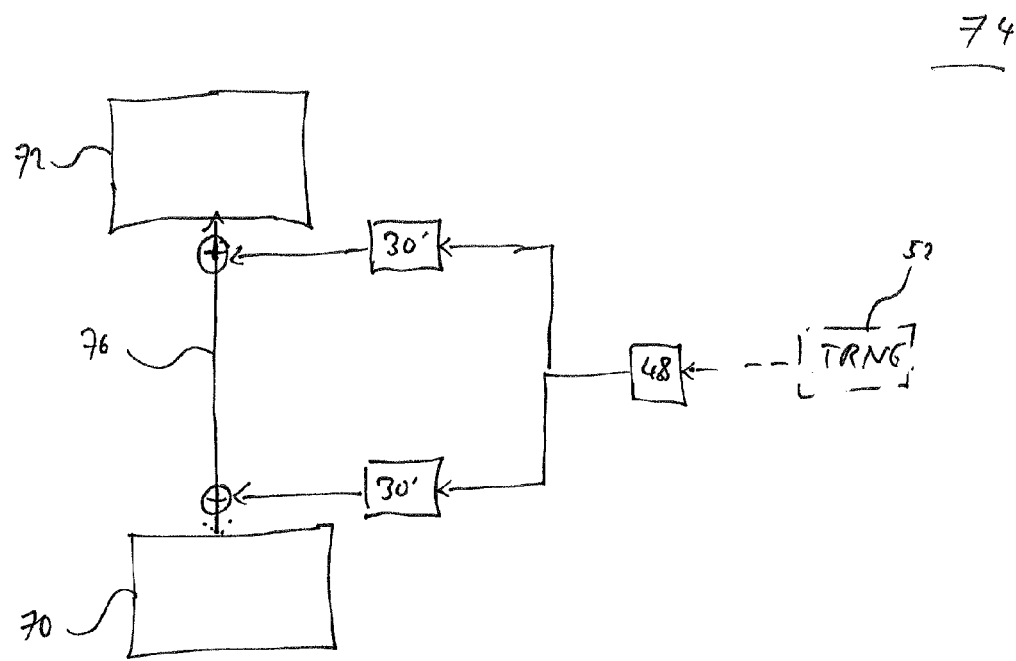
FIG. 11 shows a block diagram of a cryptographic apparatus according to an embodiment.

For sake of completeness, FIG. 11 shows a cryptographic apparatus using the above embodiments. In particular, FIG. 11 shows a cryptographic apparatus comprising two circuit parts 70 and 72 with one of them acting, for example, as a sender and the other as a receiver, wherein, however, a bidirectional communication between them may also take place, In any case, the apparatus of FIG. 11 which is generally indicated by reference sign 74 also comprises a transmission bus 76 connected therebetween which is configured to use the sequences of masked values of any of the above outlined embodiments to subject data to be transmitted between circuit parts 70 and 72 to masking such as, for example, by XOR-ing the sequence of data values value by value with the sequence of masked values. To this end, two instantiations of an NLFSR such as NLFSR 30' could be used one at sender 70 and the other at receiver 72. Both would have to be provided with the equal sequence of mask value $m_i$ and to this end, both NLFSR 30' instantiations could be connected to the same FSR 48 as depicted in FIG. 11, or, alternatively, two instantiations of FSR 48 could be used, one for each NLFSR instantiation. In the optional case of using the true random number generator 52 for seeding and/or intermittent influencing the FSR's 48 internal state, same as commonly used.

The cryptographic apparatus 74 in FIG. 11 may, for example, form a chip card, a cryptographic chip, a cellular phone, or some portable or non-portable electric equipment on which cryptographic functions necessitate cryptographic security measures.

The described masking schemes can be easily extended to higher order masking by setting $$x'_i = x_i + m_i + n_i + \ldots,$$

where $m_i, n_i, \ldots$ are the masks providing, $1^{st}$ order, $2^{nd}$ order, etc. security. As a result the masked circuit will consist of r+1 shift register chains, where r is the order of the countermeasure plus a mask correction circuit h(.). That is, for DPA attacks of higher order, it is possible to use more than one mask per value $x_i$. In effect, this necessitates one further identical shift register per such additional mask value wherein the additional shift register runs with the additional masks so that a substantially more complicated correcting function results.

In the foregoing Detailed Description, it can be seen that various features are grouped together in embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Furthermore, in some embodiments a single step may include or may be broken into multiple sub steps. Such sub steps may be included and part of the disclosure of this single step unless explicitly excluded.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or nontransitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A nonlinear feedback shift registers (NLFSR) of length k, configured to output a sequence of masked values $x'_i = x_i + m_i$, according to a masked recurrence $x'_{n+k} = f(x'_n, \ldots, x'_{n+k-1})$, the NLFSR comprising:
    a nonlinear feedback function comprising a feedback circuit of gates and configured to compute $f(x'_n, \ldots, x'_{n+k-})$ so as to obtain a feedback value;
    a correction function comprising a correction circuit of gates and configured to compute $f(m_n, \ldots, m_{n+k-1}) + m_{n-k} + h(m_n, \ldots, m_{n+k-1}, x_n, \ldots, x_{n+k-1})$ to obtain a correction value c; and a corrector connected to the correction function and configured to correct the feedback value using the correction value c to obtain a corrected feedback value which forms $x'_{n+k}$, wherein $m_i$ is a mask which is applied to $x_i$, wherein the NLFSR comprises a shift register of a sequence of n registers configured to store the masked values $x'_{n+k-1}, \ldots, x'_n$.

2. The NLFSR according to claim 1, wherein the nonlinear feedback function comprises a feedback circuit of Boolean logic gates wherein inputs of the feedback circuit are connected to outputs of at least a subset of the registers of the shift register and an output of the feedback circuit is coupled to an input of the shift register.

3. The NLFSR according to claim 2, wherein the output of the feedback circuit is connected to the input of the shift register via the corrector.

4. The NLFSR according to claim 2, wherein the feedback circuit's inputs are disconnected from any output of the first s≥1 registers of the shift register and the corrector is connected to any of an input or output of any of the first s registers of the shift register so as to perform the correction.

5. The NLFSR according to claim 4, wherein the mask correction function comprises a combinatorial circuit wherein inputs of which are connected to outputs of at least a subset of the registers of the shift register and an output of the combinatorial circuit is coupled to an input of the shift register wherein the combinatorial circuit's inputs are disconnected from any output of the first s≥1 registers of the shift register.

6. The NLFSR according to claim 5, wherein the combinatorial circuit results in a number of pipeline stages smaller than or equal to s.

7. The NLFSR according to claim 1, wherein the correction function is configured such that $$h = \sum_{p=1}^{P} \prod_{q=1}^{Q(p)} \prod_{r=1}^{R(p)} x'_{s(q)} m_{t(r)} \text{ with}$$

$n \le s(q) \le n+k-1$ for all $1 \le q \le Q(p)$ and all $1 \le p \le P$ $n \le t(r) \le n+k-1$ for all $1 \le r \le R(p)$ and all $1 \le p \le P$.

8. The NLFSR according to claim 1, wherein the mask correction function is implemented in a DPA secure manner such that any intermediate result is statistically uncorrelated to the unmasked values.

9. The NLFSR according to claim 1, wherein the mask correction function comprises a combinatorial circuit comprising sequential circuit elements configured to suppress glitches.

10. An apparatus for pseudo-randomly generating a sequence of masked values, comprising:
a nonlinear feedback shift registers (NLFSR) of length k, configured to output a sequence of masked values $x'_i = x_i + m_i$ according to a masked recurrence $x'_{n+k} = f(x'_n, \ldots, x'_{n+k-1})$, the NLFSR comprising:
a nonlinear feedback function comprising a feedback circuit of gates and configured to compute $f(x'_n, \ldots, x'_{n+k-1})$ so as to obtain a feedback value;
a correction function comprising a correction circuit of gates and configured to compute $f(m_n, \ldots, m_{n+k-1}) + m_{n+k} + h(m_n, \ldots, m_{n+k-1}, x_n, \ldots, x_{n+k-1})$ to obtain a correction value c; and
a corrector connected to the correction function and configured to correct the feedback value using the correction value c to obtain a corrected feedback value which forms $x'_{n+k}$,
wherein the NLFSR is further configured to provide the mask values,
wherein $m_i$ is a mask which is applied to $x_i$,
wherein the NLFSR comprises a shift register of a sequence of n registers configured to store the masked values $x'_{n+k-1}, \ldots, x'_n$.

11. The apparatus according to claim 10, wherein the NLFSR comprises a true random number generator for providing the mask values.

12. The apparatus according to claim 10, wherein the NLFSR comprises a feedback shift register for providing the mask values.

13. The apparatus according to claim 12, wherein the NLFSR comprises a true random number generator and the feedback shift register is seeded and/or an internal state of the feedback shift register intermittently influenced by, the true random number generator.

14. The apparatus according to claim 13, wherein a length of the feedback shift register is equal to k.

15. A cryptographic apparatus, comprising:
a nonlinear feedback shift registers (NLFSR) of length k, configured to output a sequence of masked values $x'_i = x_i + m_i$ according to a masked recurrence $x'_{n+k} = f(x'_n, \ldots, x'_{n+k-1})$ the NLFSR comprising:
a nonlinear feedback function comprising a feedback circuit of gates and configured to compute $f(x'_n, \ldots, x'_{n+k-1})$ so as to obtain a feedback value;
a correction function comprising a correction circuit of gates and configured to compute $f(m_n, \ldots, m_{n+k-1}) + m_{n+k} + h(m_n, \ldots, m_{n+k-1}, x_n, \ldots, x_{n+k-1})$ to obtain a correction value c;
a corrector connected to the correction function and configured to correct the feedback value using the correction value c to obtain a corrected feedback value which forms $x'_{n+k}$; and
two circuit parts and a transmission bus,
wherein the transmission bus is configured to use the sequence of masked values to subject data to be transmitted between the circuit parts, to masking,
wherein $m_i$ is a mask which is applied to $x_i$,
wherein the NLFSR comprises a shift register of a sequence of n registers configured to store the masked values $x'_{n+k-1}, \ldots, x'_n$.

16. The cryptographic apparatus according to claim 15, wherein the cryptographic apparatus is a chip card, a cryptographic chip or a cellular phone.

17. A method, comprising:
generating a sequence of masked values $x'_i = x_i + m_i$, using a nonlinear feedback shift registers (NLFSR) of length k, the NLFSR comprising a nonlinear feedback function configured to compute $f(x_{n+k-1})$ so as to obtain a feedback value;
computing $f(m_n, \ldots, m_{n+k-1}) + m_{n+k} + h(m_n, \ldots, m_{n+k-1}, x_n, \ldots, x_{n+k-1})$ to obtain a correction value c; and
correcting the feedback value using the correction value c to obtain a corrected feedback value which forms $x'_{n+k}$,
wherein $m_i$ is a mask which is applied to $x_i$,
wherein the NLFSR comprises a shift register of a sequence of n registers configured to store the masked values $x'_{n+k-1}, \ldots, x'_n$.

18. Non-transitory computer readable digital storage medium having stored thereon a computer program having a program code for performing, when running on a computer, a method according to claim 17.

* * * * *